(12) United States Patent
Westberg et al.

(10) Patent No.: US 11,218,414 B2
(45) Date of Patent: Jan. 4, 2022

(54) APPARATUS AND METHOD FOR CONTROLLING COMMUNICATION BETWEEN AN EDGE CLOUD SERVER AND A PLURALITY OF CLIENTS VIA A RADIO ACCESS NETWORK

(71) Applicant: Telefonaktiebolaget LM Ericsson (publ), Stockholm (SE)

(72) Inventors: Lars Westberg, Huddinge (SE); Åke Arvidsson, Åhus (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/958,148

(22) PCT Filed: Dec. 27, 2017

(86) PCT No.: PCT/SE2017/051353
§ 371 (c)(1),
(2) Date: Jun. 25, 2020

(87) PCT Pub. No.: WO2019/132744
PCT Pub. Date: Jul. 4, 2019

(65) Prior Publication Data
US 2020/0366619 A1    Nov. 19, 2020

(51) Int. Cl.
*H04L 12/835* (2013.01)
*H04L 12/801* (2013.01)
(Continued)

(52) U.S. Cl.
CPC ............ *H04L 47/30* (2013.01); *H04L 47/193* (2013.01); *H04L 47/27* (2013.01); *H04W 28/0247* (2013.01); *H04W 28/0278* (2013.01)

(58) Field of Classification Search
None
See application file for complete search history.

(56) References Cited

U.S. PATENT DOCUMENTS 7,426,181 B1    9/2008 Feroz et al.
2010/0322172 A1* 12/2010 Hsu ...................... H04L 1/1867
370/329

(Continued)

FOREIGN PATENT DOCUMENTS

WO    2016100890 A1    6/2016
WO    WO-2016100890 A1 *  6/2016  ............. H04L 47/22

OTHER PUBLICATIONS

International Search Report and Written Opinion for International Application No. PCT/SE2017/051353, dated Sep. 17, 2018, 9 pages.

(Continued)

*Primary Examiner* — Anh Ngoc M Nguyen
(74) *Attorney, Agent, or Firm* — NDWE LLP

(57) ABSTRACT

A method of controlling communication between an edge cloud server and a plurality of clients via a radio access network comprises determining per-client buffer information relating to one or more buffers in the radio access network based on known configuration information, and dynamically determining current traffic flow information associated with a client in the radio access network. The determined per-client buffer information relating to the client, and traffic flow information associated with the client, is used to determine an amount of free buffer space available in the per-client buffer associated with that client. The method comprises controlling communication between the edge cloud server and the client, via the radio access network, based on the determined free buffer space.

21 Claims, 10 Drawing Sheets

(51) Int. Cl.
*H04L 12/807* (2013.01)
*H04W 28/02* (2009.01)

(56) References Cited

U.S. PATENT DOCUMENTS

2015/0019715 A1* 1/2015 Ronen .................... H04W 4/60
　　　　　　　　　　　　　　　　　　　　　　　709/224
2017/0099196 A1* 4/2017 Barsheshet ............ H04L 49/70
2019/0158575 A1* 5/2019 Jan ........................ G06F 9/5022

OTHER PUBLICATIONS

NGMN Alliance, "Edge Computing," Oct. 10, 2016, 15 pages, Version 1.0, NGMN 5G Project Requirements & Architecture Work Stream End-to-End Architecture.

Arvidsson et al., "Fast Transport for Edge Computing in 5G Networks," 2018, 4 pages, 26th International Conference on Software, Telecommunications and Computer Networks (SoftCOM).

\* cited by examiner

APPARATUS AND METHOD FOR CONTROLLING COMMUNICATION BETWEEN AN EDGE CLOUD SERVER AND A PLURALITY OF CLIENTS VIA A RADIO ACCESS NETWORK

CROSS-REFERENCE TO RELATED APPLICATIONS

This application is a National stage of International Application No. PCT/SE2017/051353, filed Dec. 27, 2017, which is hereby incorporated by reference.

TECHNICAL FIELD

The present invention relates to an apparatus and method for controlling communication between an edge cloud server and a plurality of clients via a radio access network.

BACKGROUND

For quite some years there has been a continuous increase in cloud computing, which has led to users reducing their investments in hardware and software, and instead leasing computing resources in large data centres which are accessed over the Internet.

A server is today designed with a Platform as a Service (PaaS) where the lower part of the system has several common components and an application is only using higher-layer APIs.

While cloud computing offers increased flexibility and reduced costs, there are also real time limitations due to the physical distances, network congestion and transport protocols and these limitations have sparked an interest in geographically dispersed data centres, also referred to as "distributed clouds".

From comparing these alternatives it can be seen that, although distributed clouds improve real time characteristics, a large class of potential 5G applications will need further improvements, for example as discussed in a paper entitled "Edge Computing", NGMN 5G P1 Requirements & Architecture, Work Stream End-to-End Architecture, NGMN Alliance, Version 1.0 (2016).

For this reason a solution called edge computing has been proposed, and it has been shown that this solution can reduce data transfer times considerably, but that the short distance alone is not enough, and as such new transport protocols must be deployed.

Part of a Platform-as-a-Service architecture, as mentioned above, are transmission protocols, such as the Transmission Control Protocol, TCP.

In more detail, present transport protocols such as TCP, include time consuming establishments (TCP: three way handshake), cautious start (TCP: initial window), sensitive congestion control (TCP: based on estimations of, e.g., loss, RTT or throughput) and delayed retransmissions (TCP: several RTTs).

FIG. 1 shows an example of a slow start process 102 during an initial period 103 of a TCP communication, with 101 representing an ideal throughput on a particular communication link.

There are continuous efforts in the research community to improve these and other aspects, and several research contributions known to people skilled in the art have suggested such methods. However, the fundamental requirement of despite limited visibility, adapting the transmission rate to an unknown and variable network cannot be compromised with, and this puts limits to the gains that be achieved by improving different aspects of TCP or other transport protocols, such as the Quick UDP Inter Connections (QUIC) protocol or the Stream Control Transmission Protocol (SCTP), which is a transport for multilexed end-user requests. In this case, the issues mentioned herein apply to the multiplexed transport.

Edge computing in base stations is, however, fundamentally different in that there is only one hop, the radio, and this is controlled by the base station itself. Thus, the base station not only delivers the computing services but it may also optimise the transport through complete knowledge of queued packets, transport capacities, and user availabilities.

It has been proposed to provide interactions between RAN (3G, 4G, and 5G) and TCP. Some of these interactions have also been proposed in standardization at, e.g., ETSI-MEC.

One of these solutions is based on the RAN sending bandwidth values to TCP senders such that the latter can adapt their rates to current RAN conditions, but other types of interaction by sending status information have also been discussed in the research.

Common to all such models is the need for standardised interfaces between the RAN and the PaaS, and a continuous or at least frequent exchange of information in order to handle variable conditions caused by load variations and user mobility. The requirements of multi-vendor and high-frequency make these solutions difficult to implement in practice.

SUMMARY

It is an aim of the present invention to provide a method and apparatus which obviate or reduce at least one or more of the disadvantages mentioned above.

According to a first aspect of the present invention there is provided a method of controlling communication between an edge cloud server and a plurality of clients via a radio access network, RAN. The method comprises determining per-client buffer information relating to one or more buffers in the radio access network based on known configuration knowledge, and dynamically determining current traffic flow information associated with a client in the radio access network. The method comprises using the determined per-client buffer information relating to the client, and traffic flow information associated with the client, to determine an amount of free buffer space available in the per-client buffer associated with that client. The method comprises controlling communication between the edge cloud server and the client, via the radio access network, based on the determined free buffer space.

According to another aspect of the present invention there is provided an edge cloud server for communicating with a plurality of clients via a radio access network, RAN. The edge cloud server comprises a processor and a memory, said memory containing instructions executable by said processor. Said edge cloud server is operative to determine per-client buffer information relating to one or more buffers in the radio access network based on known configuration information, and dynamically determine current traffic flow information associated with a client in the radio access network. The edge cloud server is operative to use the determined per-client buffer information relating to the client, and traffic flow information associated with the client; to determine an amount of free buffer space available in the per-client buffer associated with that client, and control communication between the edge cloud server and the client, via the radio access network, based on the determined free buffer space.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Figure 1:
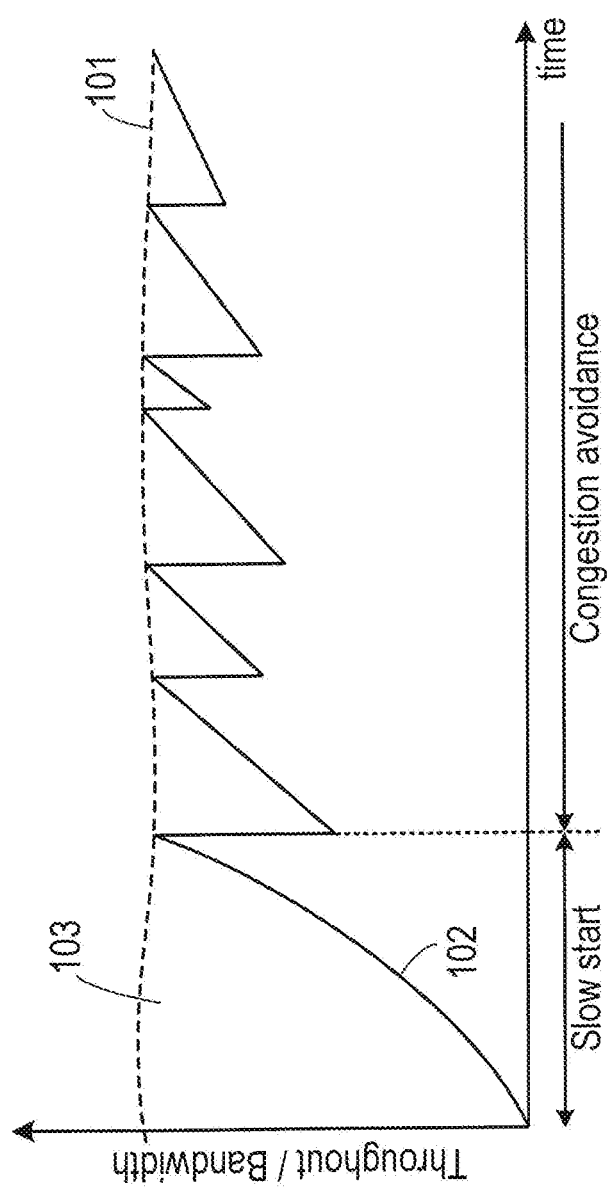
FIG. 1 shows an example of a slow start process in a transmission control protocol, TCP, communication.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a "client" or wireless device, or user equipment (UE), it should be understood by the skilled in the art that "UE" is a non-limiting term comprising any mobile or wireless terminal, device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, etc.

The description involves communication between a UE and a radio access network, which typically includes multiple radio access nodes. In the specific example given, the radio access nodes take the form of eNodeBs (eNBs), as defined by 3GPP, or gNodeBs (gNBs) as utilised in the future standards expected to meet the 5G requirements. However, it will be appreciated that the concepts described herein may involve any radio access nodes. Moreover, where the following description refers to steps taken in or by a radio access node, this also includes the possibility that some or all of the processing and/or decision making steps may be performed in a device that is physically separate from the radio antenna of the radio access node, but is logically connected thereto. Thus, where processing and/or decision making is carried out "in the cloud", the relevant processing device is considered to be part of the radio access node for these purposes.

The embodiments described herein provide solutions for senders of data from an edge cloud server, for example transmission control protocol (TCP) senders, to adapt their rates to current Radio Access Network (RAN) conditions, for example during an initial period of transmission, such as a TCP Initial Window, and wherein the RAN does not support an explicit interface with an edge cloud server for this purpose.

In 3GPP, the concept of radio access bearer (RAB) in cellular RAN is designed for per-client treatment and traffic isolation between clients. Each RAB has its own logical association of buffers in the RAN. Those buffers can be within RLC/MAC or at the ingress to the RAN.

If edge cloud servers are placed close to a Radio Access Network, RAN, according to embodiments described herein an edge cloud server can exploit the "per-client—buffers". If the cloud is connected via a transport network, the buffers in the transport network will be shared, for example, between many clients and transport congestion can harm or damage the performance for an edge-application, for example whereby the use of shared buffers can result in an improved performance for one UE (e.g. achieved by seizing a large part of the buffer) but to the detriment of another UE. It is noted that a RAN separates UEs such that in a RAN buffer a UE can only hurt itself (i.e. other applications it may run itself) but not other UEs (i.e. the applications of other UEs).

An on-line proposal having an explicit interface is proposed in ETSI-MEC, that requires a multi-vendor interface to enable a server to be connected to multiple RANs. This is very difficult to achieve and requires that the 3GPP design a standard for TCP-optimization.

Currently, the standards do not support any on-line interface in 3GPP even if it has been discussed in research for a long time. The lack of acceptance for an on-line interface makes it impossible to use for cloud computing.

As mentioned above, the embodiments described herein provide solutions that do not require an explicit interface. Instead, the embodiments can use radio configuration knowledge, as will be described below.

Figure 2:
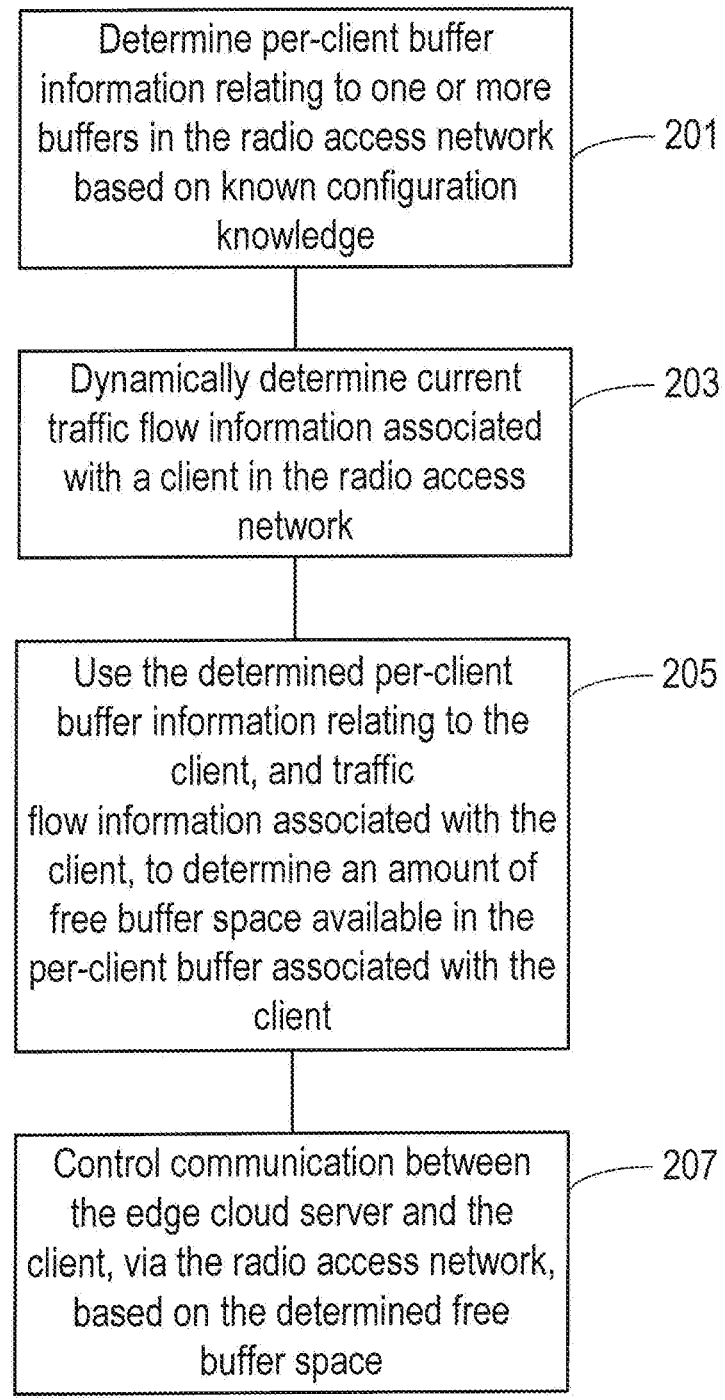
FIG. 2 shows an example of a method according to an embodiment.

FIG. 2 shows a method according to an embodiment, for controlling communication between an edge cloud server and a plurality of clients via a radio access network, RAN. The edge cloud server may be configured, for example, to operate as a platform-as-a-service, PaaS, node.

The method comprises determining per-client buffer information relating to one or more buffers in the radio access network based on known configuration knowledge, step 201.

The method comprises dynamically determining current traffic flow information associated with a client in the radio access network, step 203.

The method comprises using the determined per-client buffer information relating to the client, and traffic flow information associated with the client, to determine an amount of free buffer space available in the per-client buffer associated with that client, step 205.

The method comprises controlling communication between the edge cloud server and the client, via the radio access network, based on the determined free buffer space, step 207.

Since the step of determining per-client buffer information relating to one or more buffers in the radio access network is based on known configuration knowledge, (for example, based on network configuration information, or similar information, which is known beforehand), no interface or communication of messages is required to determine the per-client buffer information.

The per-client buffer information may include, for example, buffer length information, or information relating to buffers having active queue management, such as a) "maximum time for data to stay in the buffer" before it is discarded, or b) parameters for Random Early Drop settings.

As will be explained in greater detail below, the step of dynamically determining current traffic flow information associated with a client in the radio access network, may comprise probing traffic flows to determine this information, for example using a flow detection probe, FDP, configured to eavesdrop on header information contained in the traffic flows. A FDP is therefore able to monitor traffic flow without necessarily interrupting the traffic flow or affecting the traffic flow.

It is noted that references herein to a per-client buffer, include both physical buffers and logical buffers (e.g. whereby a logical buffer is split among multiple hardware buffers).

The step of controlling communication may comprise controlling a flow of packets sent by an application running on the edge cloud server to the radio access network during an initial period of packet transmission.

For example, where a communication protocol, for example Transmission Control Protocol, TCP, is used, the method may comprise controlling a TCP initial window, TCP-IW. It is noted that other communication protocols may be used, including for example a Quick UDP Inter Connections (QUIC) communications protocol, or a Stream Control Transmission Protocol (SCTP).

It is noted, however, that the embodiments are not limited to controlling communication during an initial window at the start of communication. In other embodiments, the initial window may comprise a window that exists when looking to increase or decrease a capacity of a given communication link from a current level to a different level.

The step of controlling communication may comprises adjusting an initial window size, e.g. a TCP-IW, according to which packets are transmitted, based on a determined amount of free buffer space available. It is noted that the initial window can be thought of as a form of "credit" in terms of outstanding (i.e. sent but not acknowledged) packets, rather than a window in time.

According to one example, adjusting the initial window size comprises determining whether any other traffic flows are currently in progress with that client, and configuring the initial window size to match the determined amount of free buffer space, if it is determined that no other traffic flows are currently in progress.

By configuring the initial window size, e.g. the TCP initial window size, to match the available buffer space, this means that the TCP can send data until the buffer or queue is full without being limited by the need to receive TCP ACK messages.

In the embodiment above, this may correspond to a Transport Configuration Function (TCF) applying a simple policy of assigning the entire RAN buffer as the TCP-IW if, and only if, there is no other flows in progress for that client, and in all other cases assign normal TCP-IW values (normal being whatever the TCP-IW would be without the embodiments described herein).

It is noted that "other flows" may include, for example, a first kind which are other flows sent from other nodes which are different to the edge cloud server of the method in FIG. 2 (and for which the traffic flows thus need to be determined or estimated by probing), and a second kind which are other flows from the same edge cloud server of the method in FIG. 2 (and for which there is potentially more detailed information available, i.e. internally in that node, the edge cloud server).

In some examples, determining whether any other traffic flows are currently in progress comprises counting the presence or absence of packets relating to other traffic flows.

The presence or absence of other traffic flows may comprise, in one embodiment, counting the time since a last packet has flowed, and interpreting the absence of a packet for a predetermined time interval (t seconds) as indicative of no other traffic flows being in progress.

In this case, the task of an embodiment using a flow detection probe, FDP, is to detect presence or absence of other flows. This may be done, for example, simply by counting the time since the last packet and interpret the absence of a packet for at least t seconds as a sign of no flows in progress.

The predetermined time interval (t seconds) may be selectively variable. The time-out t may be set to any value, e.g., one second.

According to another embodiment, adjusting an initial window size, e.g. a TCP-IW size, comprises determining the number of traffic flows in progress, and assigning a value to the initial window size that matches a desired fraction of the RAN buffer space, based on the determined number of traffic flows in progress.

As such, in this type of embodiment the TCF may want to apply a somewhat more advanced policy of assigning different fractions of the RAN buffer as IW depending on the number of flows in progress. In this case the FDP can keep track of all flows seen during last t seconds and interpret this number as the number of flows in progress.

Determining the number of traffic flows in progress may comprise monitoring all flows seen during a previous predetermined time interval (last t seconds), and interpreting the number of flows seen during the previous predetermined time interval as the number of traffic flows in progress.

Monitoring a traffic flow may comprise using internet protocol, IP, five tuple information. The five tuple information may include, for example, IP headers or TCP or UDP port numbers. For example, a table of IP five tuples is provided in one embodiment, each of which is associated with a timer. For every packet seen the FDP scans the table and if its five tuple is found, its timer is restarted, and if its five tuple is not found, it is inserted in the table and the timer is started.

According to one embodiment, the method may comprise monitoring content information of the traffic flows, and detecting packet data from the content information to identify the number of traffic flows.

For example, the packet data may relate to packet start and/or packet end information, which is used to determine a particular traffic flow.

In an embodiment where the communication protocol is TCP, the packet start and/or packet end information comprises SYN and FIN/RST flags within a TCP packet flow.

Thus, in this type of embodiment, under the same TCF policy as above, the FDP is instead configured to monitor the flow of packets in more detail and detect actions to open and close flows by, e.g., scanning for SYN and FIN/RST flags in the TCP packets. Timers may also be used in this type of policy, for example timers with some larger value to e.g., remove improperly terminated flows.

According to another embodiment, configuring the initial window size, e.g. TCP-IW size, comprises assigning a value to the initial window size that matches a desired fraction of a RAN buffer space, depending on an estimated number of packets in the RAN buffer. In such an embodiment different fractions of RAN buffer are assigned as TCP-IW depending upon the estimated number of packets in the RAN buffer.

This may comprise, for example, estimating the number of packets in the RAN buffer by estimating the buffer content by per-flow monitoring of inbound and outbound data volumes, and estimating the amount of free buffer space in the RAN buffer based on the estimated buffer content and the size of the buffer, wherein the size of the buffer is determined from the per-client buffer information, e.g. as described earlier.

It is noted that estimating the amount of free buffer space may be determined from statistically known relationships between inbound and outbound data volumes, or from keeping count of transmitted and acknowledged bytes, for example sequence messages and acknowledgement messages in an example relating to TCP.

Thus, in this type of embodiment the TCF may want to apply an even more advanced policy of assigning different fractions of the RAN buffer as IW depending on the estimated number of packets in the RAN buffer (denoted "used_buffer_size"). The buffer content may be estimated by per-flow monitoring of inbound and outbound data volumes and estimating the buffer length by estimating the amount of packets in flight (the latter is an upper limit of the former) from statistically known relations between input and output volumes, or from keeping track of byte counters such TCP sequence and TCP acknowledgement.

It is noted that the above policies and methods just constitute examples, and many other TCF policies, and thus many other FDP methods, may be encompassed by the present embodiments.

As mentioned earlier, determining current traffic flow information may be performed using a flow detection probe, FDP, configured to eavesdrop on header information contained in the traffic flows.

In one embodiment the FDP is located in traffic flows between the RAN buffers and a local breakout module, the local breakout module controlling traffic flow between the edge cloud sever and a central cloud server, as described below in FIG. 3.

The FDP can work in several ways to serve several different IW assignment policies applied by a TCP configuration function (TCF). As such, the information generated from FDP may vary depending on the TCF-policy. The different types of information and how they are used are discussed above. Also, the information can be conveyed from the FDP to the TCF in the server in many ways (e.g. over a TCP connection).

Figure 3:
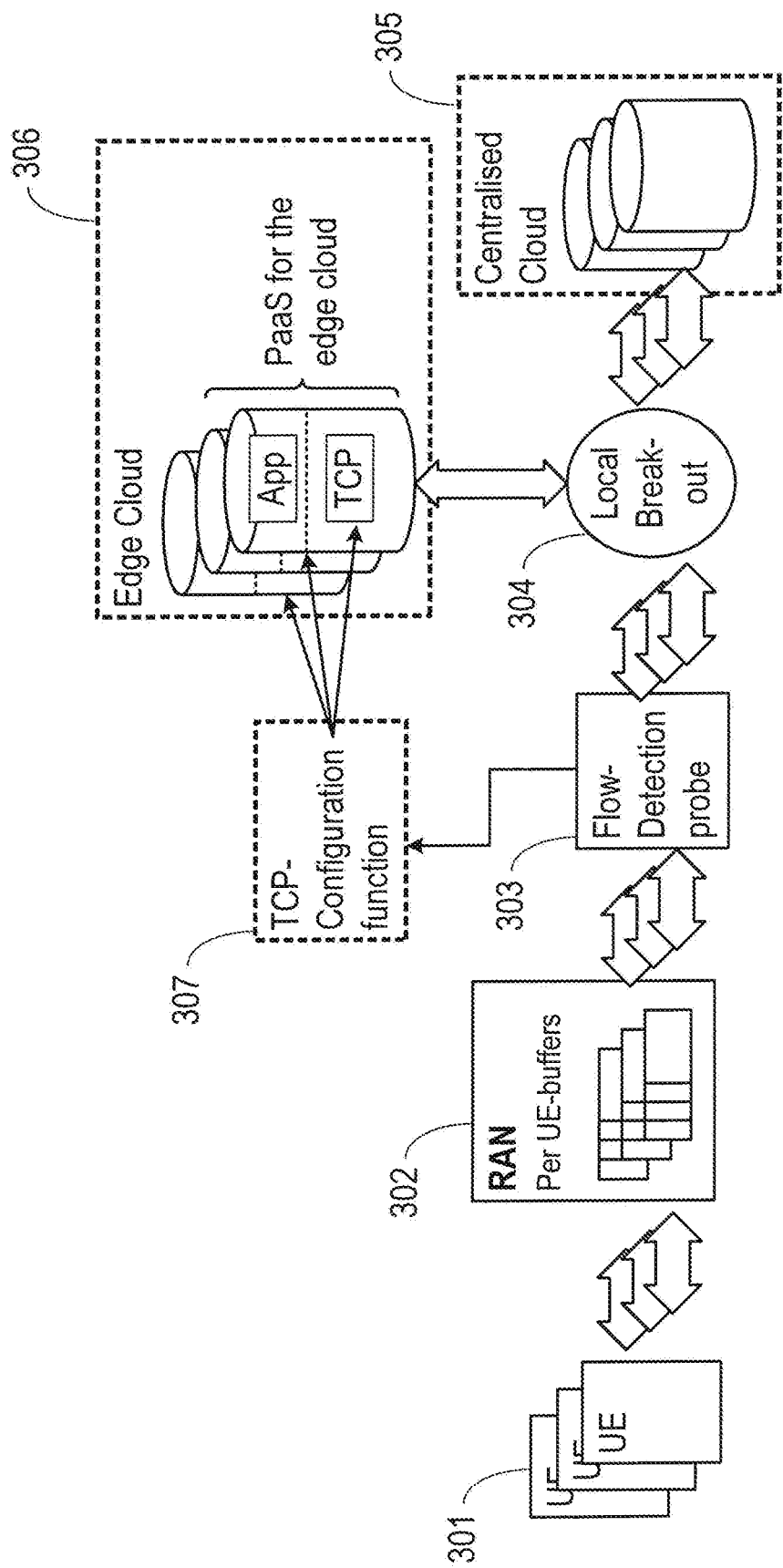
FIG. 3 shows an example of a network according to an embodiment.

FIG. 3 shows an example of network according to an embodiment. The network comprises a centralised cloud server 305 and an edge cloud server 306.

The centralised cloud server 305 and edge clouds server 306 communicate with a plurality of clients 301 via a Radio Access Network (RAN) 302. The client devices may comprise any form of user equipment as described herein. The RAN comprises plurality of per-client (or per-UE) buffers.

The edge cloud server 306 is placed at or in the RAN such that the per-client/RAB buffers can be reached by the edge cloud application server.

The edge cloud server 306 runs various applications, for example Platform-as-a-Service (PaaS) applications, and communicates with the RAN, for example using a transmission control protocol, TCP.

A TCP-Initial widow parameter can be configured by a TCP configuration function (TCF), as described in the embodiments above, for use with a PaaS with an application PaaS.

The TCP-configuration function 307 may comprise an on-line interaction with the servers in the edge-cloud. The settings of TCP are made based on the knowledge about per-client (per-UE) buffer size in RAN and the simultaneous number of flows from the UE. From a TCP point of view, the Initial window parameter affects the number of packets that can be sent from the server without waiting on a TCP acknowledgement message TCP-Ack. This is adjusted to the buffer according to the embodiments herein, such that no loss occurs, but faster transmit of the object can be achieved.

The embodiments enable a total optimized performance for high bitrate access such as 5G to be made possible.

A flow detection probe, FDP, 303 is provided for dynamically determining or acquiring traffic flow information associated with client, i.e. traffic flow information associated with respective clients. The FDP 303 can detect multiple flows. The FDP 303 can provide a function that can retrieve ongoing or current TCP-flow characteristics.

A local break-out LBO node 304 (which may also be a function in a node) is configured to route selected traffic to the edge cloud server 306 and other traffic more to centralized clouds 305 (e.g. located in internet or operator dedicated clouds). In this example, the local break-out 304 is statically set to route the traffic to/from the edge-cloud.

The functions shown in FIG. 3 interact together for optimizing the TCP-IW server settings.

The queue-size knowledge (buffer information) is known beforehand and set in the TCP-configuration function. Therefore, no online interaction with the RAN is necessary.

As described earlier, for a single TCP-flow, the initial-windows can be set to the per-client queue-size. For multiple flows, the TCP-settings are more complicated, because the queue is then shared among the flows. Therefore, a different TCP-settings is made by the TCP-configuration function. The method in the TCP for setting the initial window can have different algorithms. A per-client queue-size represents the queue-size that ideally can be allocated to a TCP-flow. The value could be the same as when a new TCP-flow is activated, when no other TCP-sessions are using the "per-_client" queue.

In one example an algorithm for controlling communication may comprise:

1) server sends an flow indication start of a flow in the Edge-cloud (it is noted that prior to this, a user may typically have sent a request to establish a connection, with the request having been routed to the edge cloud by the LBO, and at this point the server in the edge cloud wishes to determine a suitable IW).

2) fetch: a) "number_of_flow"; b) a set of "used buffer size" and c)"number_flows_with_estimated_buffer_size" that counts the number of flows, from the flow detection probe FDP. "sum_of_all (used_buffer_size)" contains the sum of all estimated "used_buffer_size".

3) set TCP-IW=(per-UE queue-size−sum_of_all (used-_buffer_size))/(number_of_flows−number_flows_with_estimated_buffer_size)

It is noted that other algorithms may be set by policies. The ways of partitioning the queue between flows can vary and be selected by policies in the TCF. Policies may be dependent on application types.

From the above it can be seen that the TCP-configuration function 307 is a function that executes algorithms based on input from the FDP 303 and which can then configure the Platform-As-A-Service TCP-stack in the edge cloud servers 306.

Figure 4:
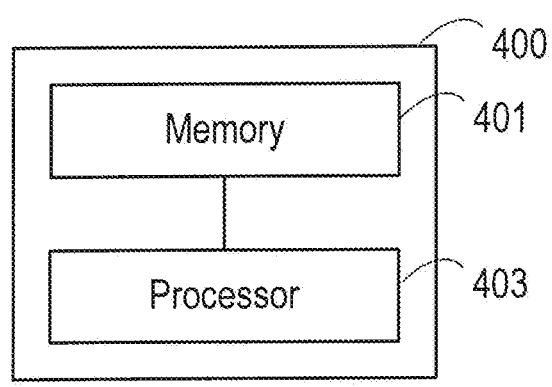
FIG. 4 shows an example of an edge cloud server according to an embodiment.

FIG. 4 shows an example of an edge cloud server 400 for communicating with a plurality of clients via a radio access network, RAN. The edge cloud server 400 comprises a processor 401 and a memory 403, said memory 403 containing instructions executable by said processor 401.

It is noted that the edge cloud server 400 may comprise a functional module forming part of a network node, including a network cloud.

The edge cloud server 400 is operative to determine per-client buffer information relating to one or more buffers in the radio access network based on known configuration knowledge, and dynamically determine current traffic flow information associated with a client in the radio access network. The edge cloud server 400 is further operative to use the determined per-client buffer information relating to the client, and traffic flow information associated with the client; to determine an amount of free buffer space available in the per-client buffer associated with that client, and control communication between the edge cloud server and the client, via the radio access network, based on the determined free buffer space.

The edge cloud server 400 may be further operative to perform a method as described above, and as defined in the appended claims.

For example, the edge cloud server 400 may be operative to control a flow of packets sent by an application running on the edge cloud server to the radio access network during an initial period of packet transmission.

The edge cloud server 400 may be further operative to adjust an initial window size, according to which packets are transmitted, based on the determined amount of free buffer space available. Adjusting the initial window size may comprise determining whether any other traffic flows are currently in progress with that client, and configuring the initial window size to match the determined amount of free buffer space, if it is determined that no other traffic flows are currently in progress.

The edge cloud server 400 may be operative to determining whether any other traffic flows are currently in progress by counting the presence or absence of packets relating to other traffic flows. This may comprise counting the time since a last packet has flowed, and interpreting the absence of a packet for a predetermined time interval (t seconds) as indicative of no other traffic flows being in progress.

The edge cloud server 400 may be operative to set of vary the predetermined time interval (t seconds).

According to other embodiments, the edge cloud server 400 is operative to adjust an initial window size by determining the number of traffic flows in progress, and assigning a value to the initial window size that matches a desired fraction of the RAN buffer space, based on the determined number of traffic flows in progress. Determining the number of traffic flows in progress may comprise monitoring all flows seen during a previous predetermined time interval (last t seconds), and interpreting the number of flows seen during the previous predetermined time interval as the number of traffic flows in progress.

In some example, monitoring a traffic flow comprises using internet protocol, IP, five tuple information.

The edge cloud server 400 may be further operative to monitor content information of the traffic flows, and detect packet data from the content information to identify the number of traffic flows, for example by detecting packet start and/or packet end information in order to determine a particular traffic flow.

According to another embodiment there is provided a computer program comprising instructions which, when executed on at least one processor, cause the at least one processor to carry out the method as described above, and as defined in the appended claims.

According to another embodiment there is provided a computer program product comprising a computer-readable medium with the computer program as described above.

The embodiments described herein therefore provide a solution for ramping up packet flow, for example during a TCP-IW or TCP slow start procedure.

The embodiments use information, including knowledge on the per-client queue-size in RAN, and knowledge about on-going flows to the client. In some embodiments this information is found by using a probe that generates flow-information or by that the reduced IW-settings is reduced by assigning a statistical limit.

An initial time window size, e.g. a TCP-Initial window, can then be adjusted to fit that queue-size. This means that TCP is configured with a specific initial window size. This means that TCP can send data until the queue is full without being limited by the absence of acknowledgement messages, TCP-acks. It is noted that when TCP-acks are sent upstream to the edge cloud server, more data can be sent to the client.

The adjustment of TCP-IW allows the edge cloud server to fill the buffer (queue) without being limited by the TCP-protocol. This has an advantage of providing much shorter download at the start of a TCP-session.

With regard to the TCP-sessions, the performance gains can depend on the bitrate and RTT.

In some embodiments, only when several flows are competing with the same buffers, is a reduced TCP-IW setting considered, in order to avoid packet loss of the queue in the RAN.

The embodiments described herein provide a significantly improved throughput at TCP-slow-start for applications using a Platform-as-a-Service platform without require an explicit interface to RAN.

The TCP-IW setting can be much higher (e.g. 300) if flows have a separate queue. In common queues e.g. in the transport, a fairness must be supported, thus the TCP-IW settings can be reduced or limited (e.g. <10). This is because, in common queues, a TCP-flow with an aggressive setting of the TCP-initial window can create packet loss for the other flows in the common queue. The affected flows will back-off and reduce their sending rate, and the system can become unfair. Thus, as explained above, if there are separate queues, packet loss can be separately managed for each queue, such that it is possible to have TCP-IW settings that can have a higher value without causing packet losses for flows in the other queue. Therefore, since the embodiments can adjust the TCP-settings with the knowledge of the Queue-size, this enables much higher performance gains compared to TCPs that pass transport buffers with unknown number of flows.

The embodiments allow operators to optimize settings for multi-vendor RAN without any RAN-exposure.

In the embodiments described here an edge cloud interaction is made for a PlatformAsAService cloud for example placed at RAN or within RAN. The cloud servers of the edge cloud can be directly associated with the per-client RAN-buffers. The embodiments are compliant to the ETSI-MEC architecture. However, the RAN does not need to provide any explicit interface for TCP-slow-start optimization.

The embodiments described herein provide a Platform-as-a-Service architecture where the embedded TCP/IP stack has an optimized TCP-slow-start procedure by configuring initial window parameters based on RAN-buffer conditions and the number of flows.

The embodiments provide an improved PaaS at the edge that gives higher performance gain that what shorter RTT can give, by using the per-client buffers in RAN. The TCP-setting in the Edge can be much more aggressive than in the internet. The "isolation" between clients is made possible by the per-UE-buffers in RAN.

Figure 5:
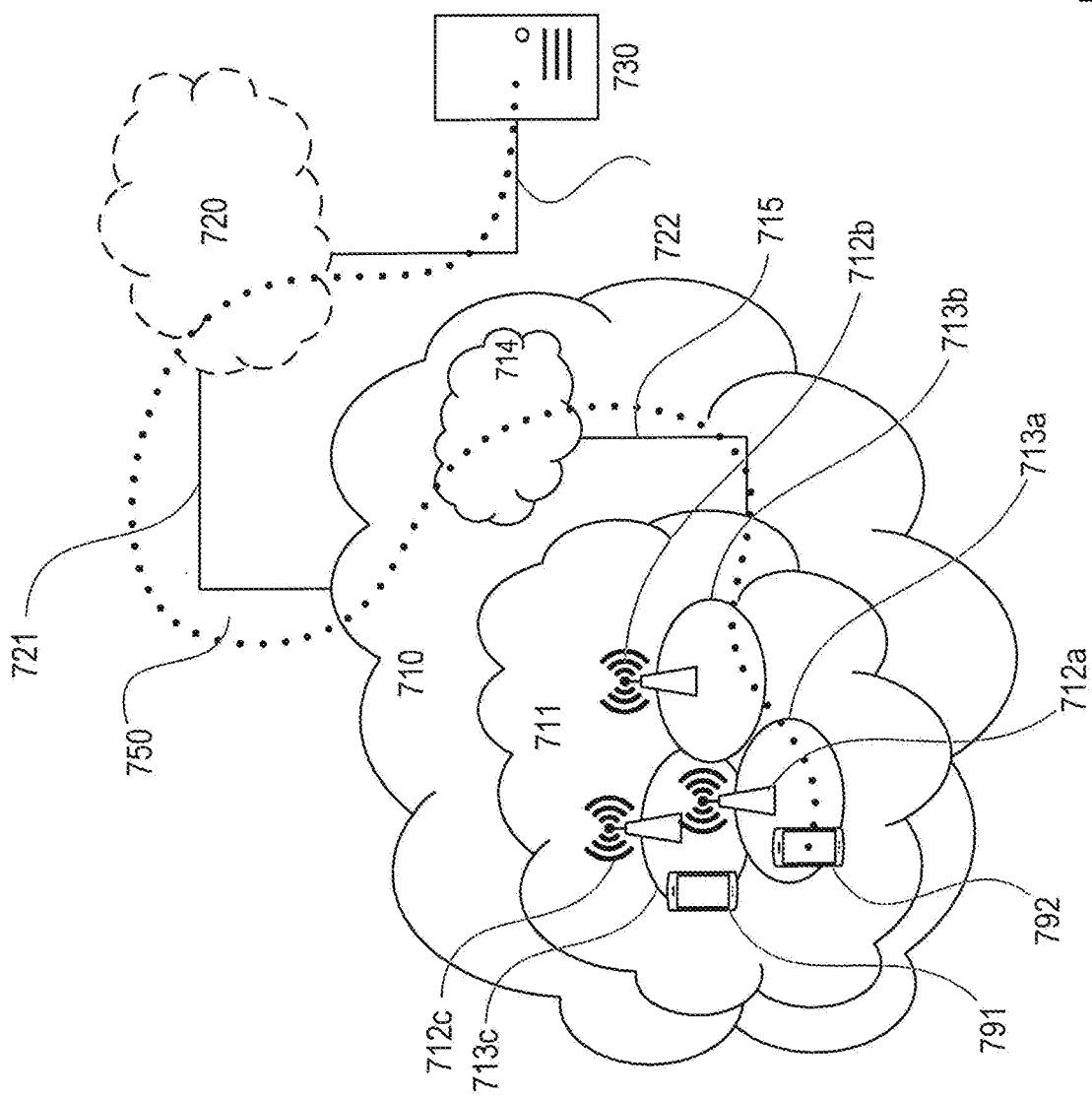
FIG. 5 illustrates a telecommunication network connected via an intermediate network to a host computer in accordance with some embodiments.

FIG. 5 illustrates a telecommunication network connected via an intermediate network to a host computer in accordance with some embodiments.

With reference to FIG. 5, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 5 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 6:
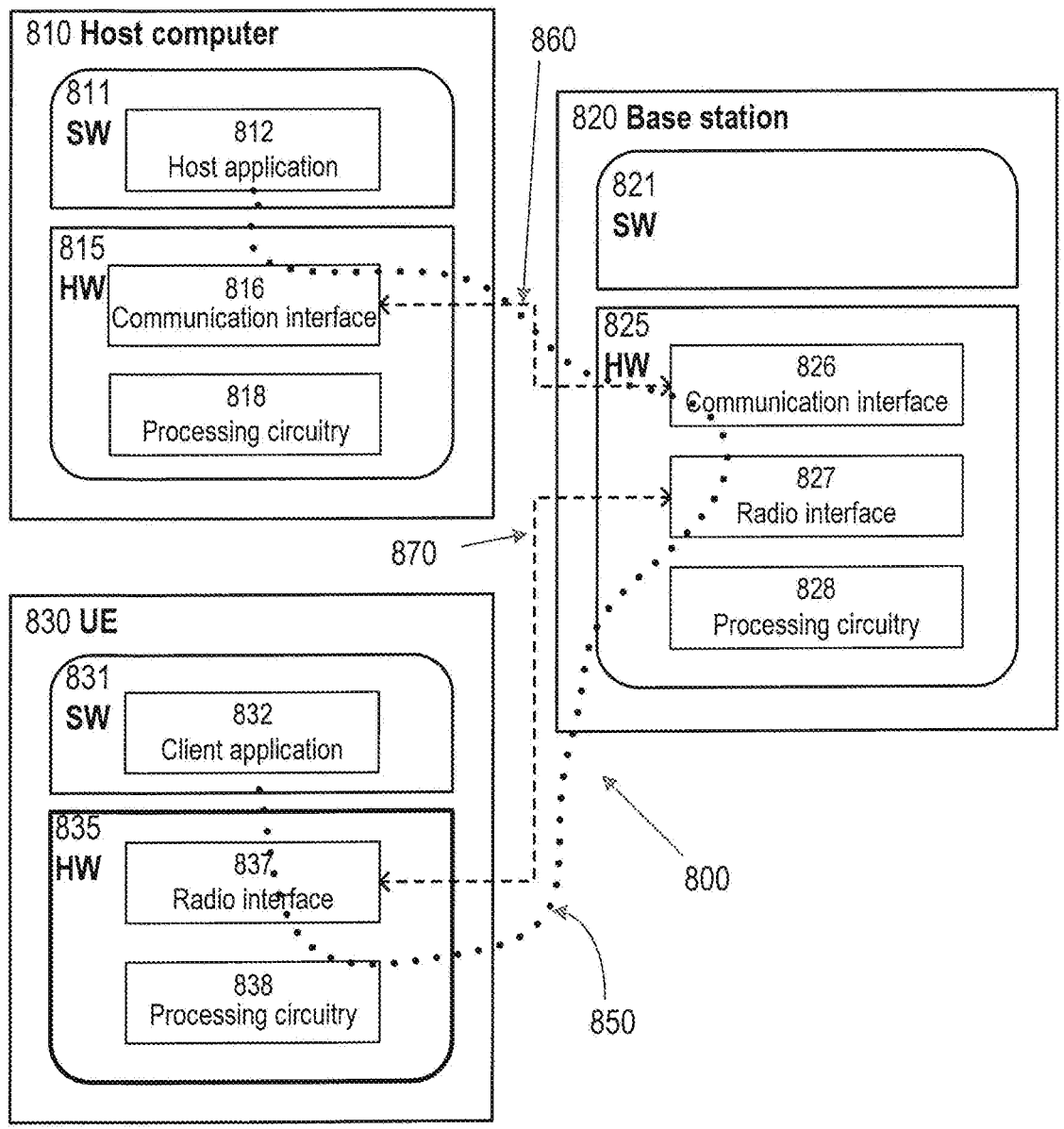
FIG. 6 illustrates a host computer communicating via a base station with a user equipment over a partially wireless connection in accordance with some embodiments.

FIG. 6 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 6. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 6) served by base station 1420. Communication interface 1426 may be configured to facilitate connection 1460 to host computer 1410. Connection 1460 may be direct or it may pass through a core network (not shown in FIG. 6) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 6 may be similar or identical to host computer 1330, one of base stations 1312a, 1312b, 1312c and one of UEs 1391, 1392 of FIG. 5, respectively. This is to say, the inner workings of these entities may be as shown in FIG. 6 and independently, the surrounding network topology may be that of FIG. 5.

In FIG. 6, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 7:
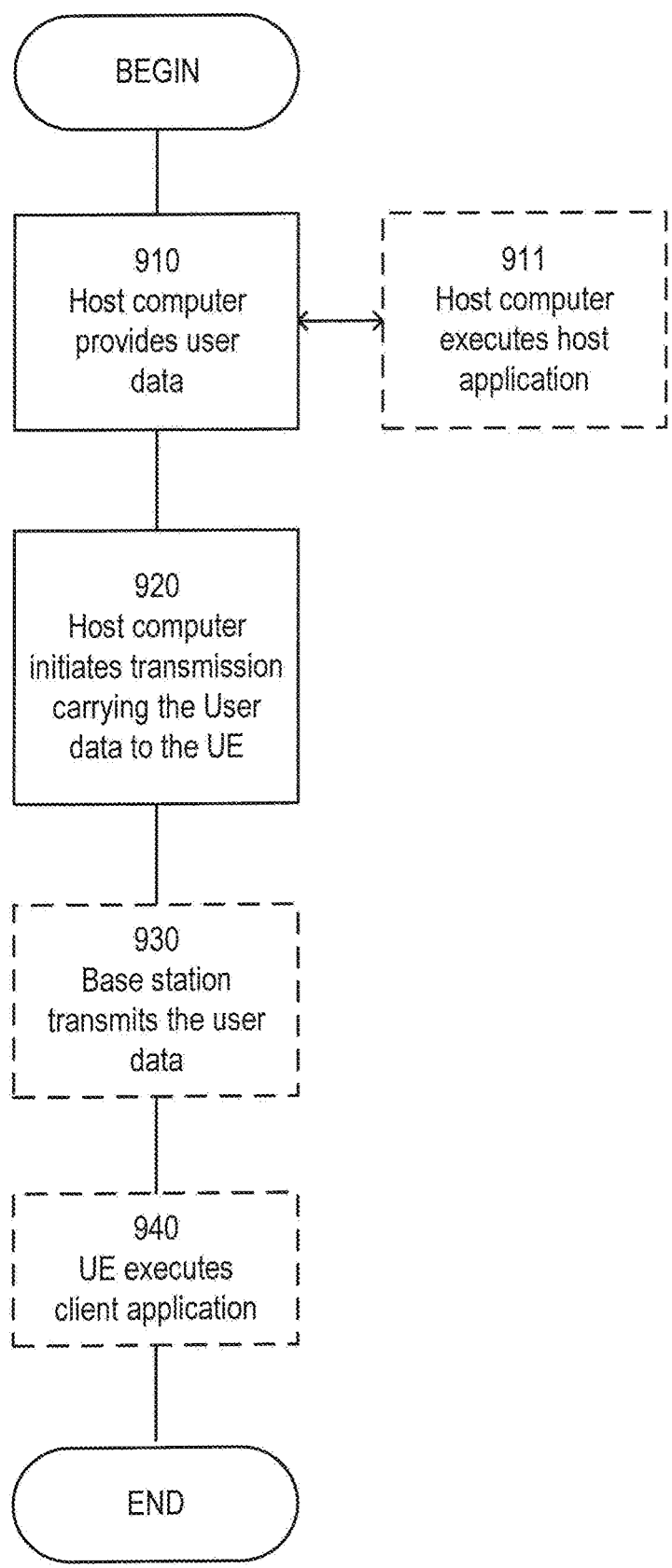
FIG. 7 illustrates methods implemented in a communication system including a host computer, a base station and a user equipment in accordance with some embodiments.

FIG. 7 illustrates methods implemented in a communication system including a host computer, a base station and a user equipment in accordance with some embodiments.

FIG. 7 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 7 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 8:
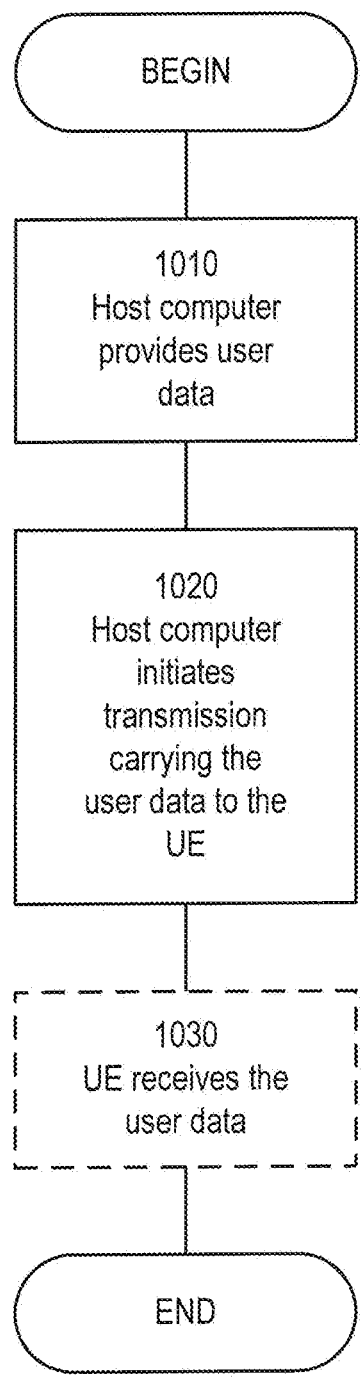
FIG. 8 illustrates methods implemented in a communication system including a host computer, a base station and a user equipment in accordance with some embodiments.

FIG. 8 illustrates methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 8 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 9:
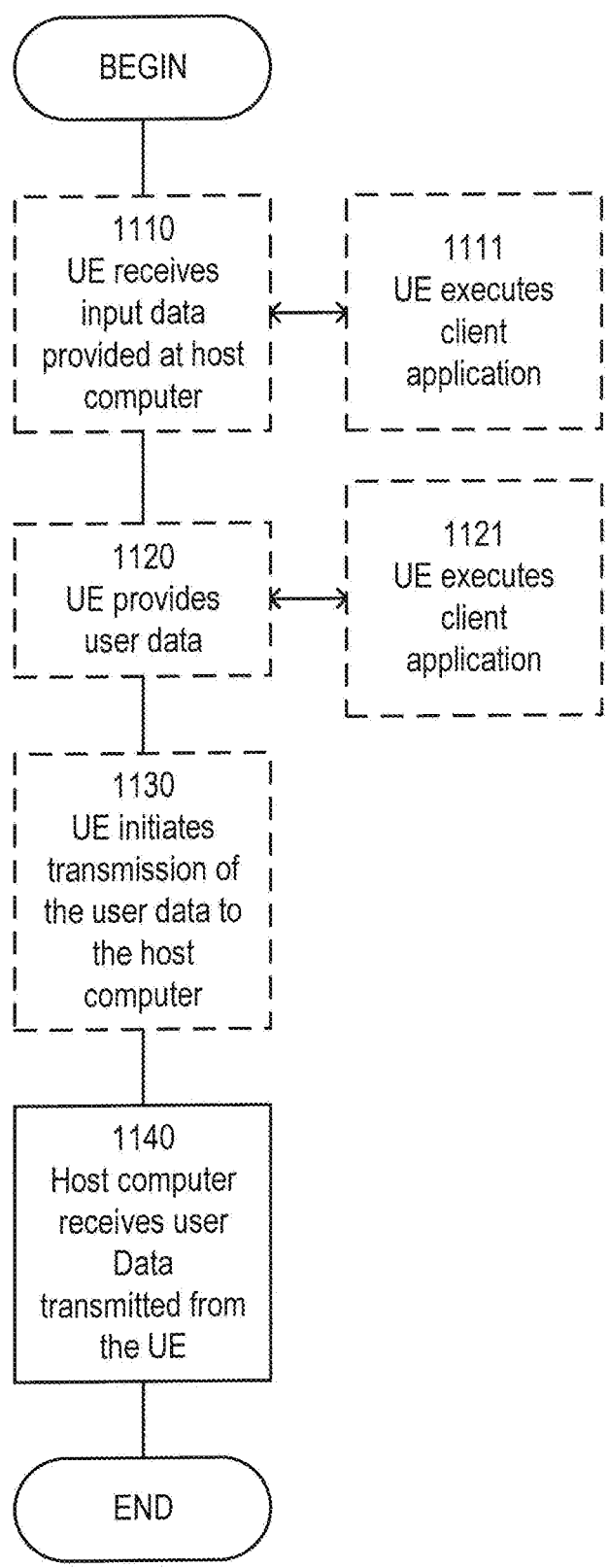
FIG. 9 illustrates methods implemented in a communication system including a host computer, a base station and a user equipment in accordance with some embodiments.

FIG. 9 illustrates methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 9 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 10:
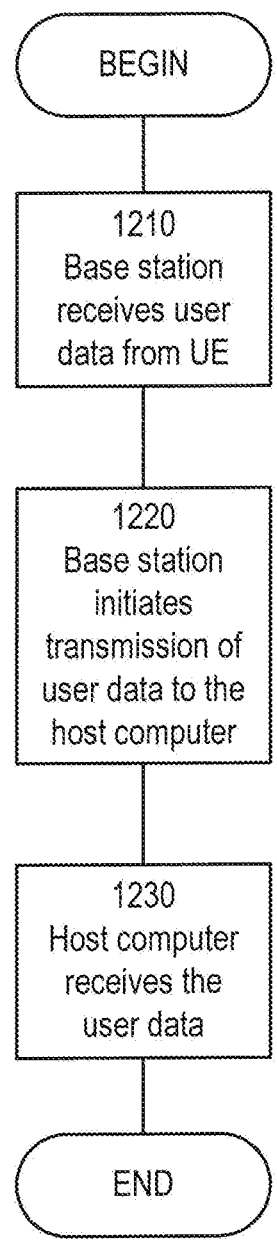
FIG. 10 illustrates methods implemented in a communication system including a host computer, a base station and a user equipment in accordance with some embodiments.

FIG. 10 illustrates methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 10 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of controlling communication between an edge cloud server and a plurality of clients via a radio access network (RAN), the method comprising:
   determining per-client buffer information relating to one or more buffers in the RAN based on known configuration knowledge;
   dynamically determining current traffic flow information associated with a client in the RAN;
   using the determined per-client buffer information relating to the client and traffic flow information associated with the client, determining an amount of free buffer space available in the per-client buffer associated with the client; and
   controlling communication between the edge cloud server and the client, via the RAN, based on the determined free buffer space by adjusting an initial window size for a flow of packets sent by an application running on the edge cloud server to the RAN, wherein the initial window size is adjusted by determining whether any other traffic flows are currently in progress with the client and configuring the initial window size to match the determined amount of free buffer space, when it is determined that no other traffic flows are currently in progress.

2. The method as claimed in claim 1, wherein the determining whether any other traffic flows are currently in progress comprises:
   counting a presence or absence of packets relating to other traffic flows.

3. The method as claimed in claim 2, wherein the counting the presence or absence of other traffic flows comprises:
   counting a time since a last packet has flowed; and
   interpreting the absence of a packet for a predetermined time interval as indicative of no other traffic flows being in progress.

4. The method as claimed in claim 3, wherein the predetermined time interval is selectively variable.

5. The method as claimed in claim 1, wherein the adjusting an initial window size further comprises:
  determining a number of traffic flows in progress; and
  assigning a value to the initial window size that matches a desired fraction of a RAN buffer space, based on the determined number of traffic flows in progress.

6. The method as claimed in claim 5, wherein the determining the number of traffic flows in progress comprises:
  monitoring flows seen during a previous predetermined time interval (last t seconds); and
  interpreting a number of flows seen during the previous predetermined time interval as a number of traffic flows in progress.

7. The method as claimed in claim 6, wherein the monitoring flows comprises using internet protocol (IP) five tuple information.

8. The method as claimed in claim 7 further comprising:
  monitoring content information of the traffic flows; and
  detecting packet data from the content information to identify the number of traffic flows.

9. The method as claimed in claim 8, wherein the packet data relating to packet start, packet end, or both packet start and packet end, information is used to determine a particular traffic flow.

10. The method as claimed in claim 1, wherein the configuring the initial window size comprises:
  assigning a value to the initial window size that matches a desired fraction of a RAN buffer space, depending on an estimated number of packets in the RAN buffer.

11. The method as claimed in claim 10, further comprising estimating the number of packets in the RAN buffer by:
  estimating a buffer content by per-flow monitoring of inbound and outbound data volumes; and
  estimating the amount of free buffer space in the RAN buffer based on the estimating buffer content and the size of the buffer, wherein the size of the buffer is determined from the per-client buffer information.

12. The method as claimed in claim 11, wherein the estimating the amount of the free buffer space is determined:
  from statistically known relationships between inbound and outbound data volumes; or
  from keeping count of sequence messages and acknowledgement messages.

13. The method as claimed in claim 1, wherein determining current traffic flow information is performed by probing traffic flows.

14. The method as claimed in claim 1, wherein determining current traffic flow information is performed using a flow detection probe (FDP) configured to eavesdrop on header information contained in the traffic flows.

15. The method as claimed in claim 14, wherein the FDP is located in traffic flows between the RAN buffers and a local breakout module, the local breakout module controlling traffic flow between the edge cloud server and a central cloud server.

16. The method as claimed in claim 1, wherein determining per-client buffer information relating to one or more buffers in the RAN is based on network configuration information.

17. The method as claimed in claim 1, wherein the communication comprises a transmission control protocol (TCP) communication and wherein the initial window size comprises a TCP initial window (TCP-IW), a quick UDP internet connections (QUIC)communications protocol, or a Stream Control Transmission Protocol (SCTP).

18. The method as claimed in claim 1, wherein the edge cloud server is configured to operate as a platform-as-a-service (PaaS) node.

19. An edge cloud server for communicating with a plurality of clients via a radio access network (RAN), the edge cloud server comprising:
  a processor; and
  a memory containing instructions which, when executed by said processor, cause said edge cloud server to:
    determine per-client buffer information relating to one or more buffers in the RAN based on known configuration information;
    dynamically determine current traffic flow information associated with a client in the RAN;
    use the determined per-client buffer information relating to the client and traffic flow information associated with the client, to determine an amount of free buffer space available in the per-client buffer associated with the client; and
    control communication between the edge cloud server and the client, via the RAN, based on the determined free buffer space by adjusting an initial window size for a flow of packets sent by an application running on the edge cloud server to the RAN, wherein the initial window size is adjusted by a determination of whether any other traffic flows are currently in progress with the client and configuration of the initial window size to match the determined amount of free buffer space, when it is determined that no other traffic flows are currently in progress.

20. The edge cloud server as claimed in claim 19, wherein the edge cloud server is configured to operate as a platform-as-a-service (PaaS) node.

21. A non-transitory computer-readable storage medium comprising instructions which, when executed on at least one processor of an edge cloud server for controlling communication between the edge cloud server and a plurality of clients vis a radio access network (RAN), are capable of causing the edge cloud server to perform operations comprising:
  determining per-client buffer information relating to one or more buffers in the RAN based on known configuration knowledge;
  dynamically determining current traffic flow information associated with a client in the RAN;
  using the determined per-client buffer information relating to the client and traffic flow information associated with the client, determining an amount of free buffer space available in the per-client buffer associated with the client; and
  controlling communication between the edge cloud server and the client, via the RAN, based on the determined free buffer space by adjusting an initial window size for a flow of packets sent by an application running on the edge cloud server to the RAN, wherein the initial window size is adjusted by determining whether any other traffic flows are currently in progress with the client and configuring the initial window size to match the determined amount of free buffer space, when it is determined that no other traffic flows are currently in progress.

* * * * *